UNITED STATES PATENT OFFICE.

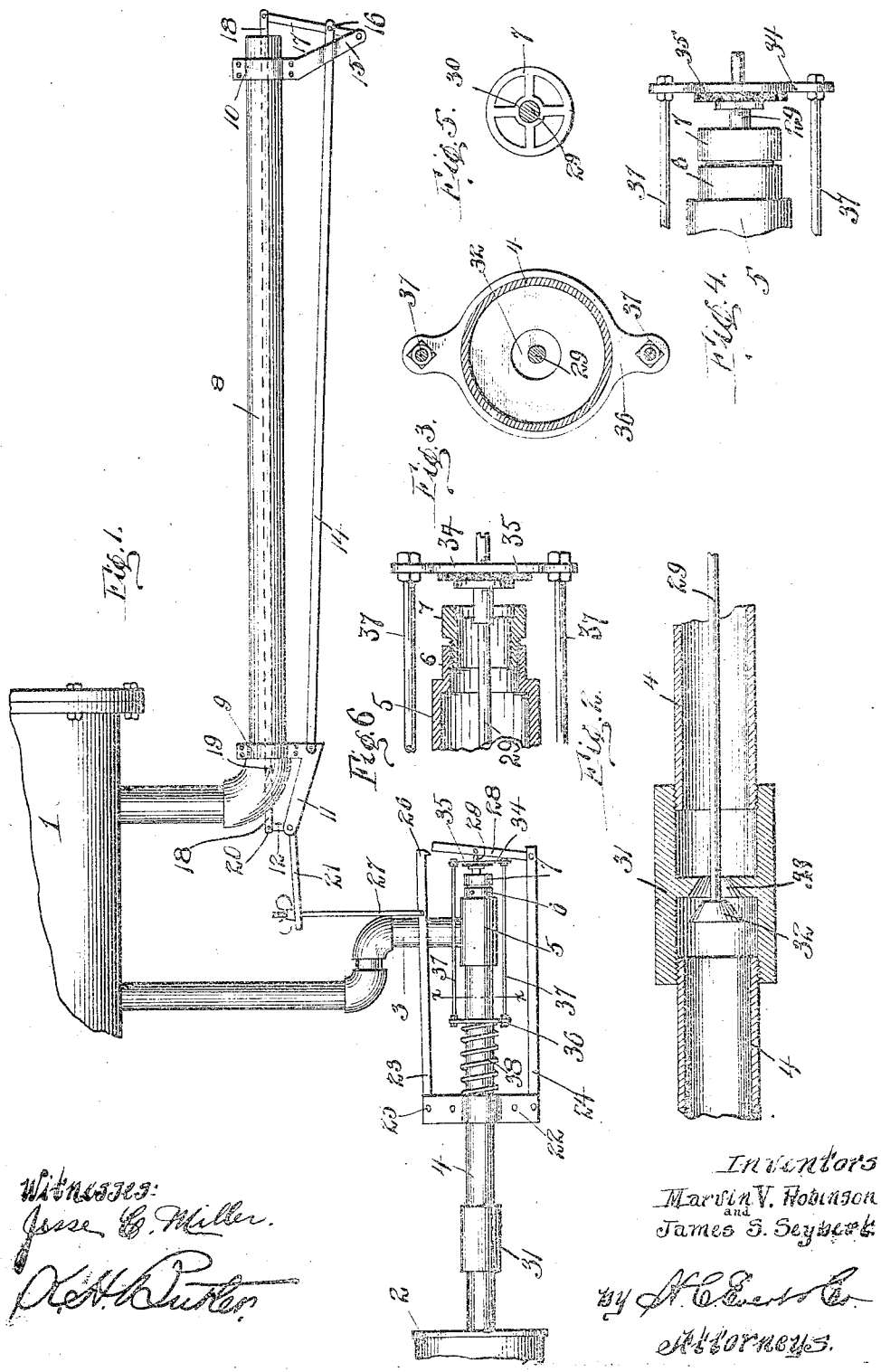

MARVIN V. ROBINSON AND JAMES S. SEYBERT, OF CHICORA, PENNSYLVANIA.

GAS-ENGINE.

No. 891,735.

Specification of Letters Patent.

Patented June 23, 1908.

Application filed July 20, 1906. Serial No. 327,008.

*To all whom it may concern:*

Be it known that we, MARVIN V. ROBINSON and JAMES S. SEYBERT, citizens of the United States of America, residing at Chicora, in the county of Butler and State of Pennsylvania, have invented certain new and useful Improvements in Gas-Engines, of which the following is a specification, reference being had therein to the accompanying drawing.

This invention relates to gas engines, and the invention relates more particularly to automatically actuated mechanism for controlling the admission of water to a gas engine.

The object of this invention is to provide positive and reliable means for effecting a perfect and complete drainage of the water jacket of the cylinder of a gas engine, thereby insuring a perfect operation of the engine and preventing water from corroding or otherwise injuring the engine.

To this end, our invention aims to provide thermostatic means for automatically closing one valve and opening another valve.

With the above and other objects in view which will more readily appear as the invention is understood, the same consists in the novel construction, combination and arrangement of parts to be presently described, illustrated and specifically pointed out in the appended claims.

Reference will now be had to the drawing forming part of this specification, wherein like numerals of reference designate corresponding parts throughout the several views, in which:—

Figure 1 is an elevation of our improved mechanism as applied to a gas engine, the latter being shown diagrammatically, Fig. 2 is a longitudinal sectional view of a valve used in connection with our improved mechanism, Fig. 3 is a cross sectional view taken on the line x—x of Fig. 1. Fig. 4 is a detail view of a portion of the mechanism illustrating another valve of the mechanism, and Fig. 5 is an end view of a valve seat. Fig. 6 is a sectional view through the coupling 5.

In the accompanying drawing, we have illustrated a portion of the cylinder 1 of a gas engine and a portion of a water tank 2 as connecting with the water jacket of said cylinder 1 by pipes 3 and 4. The pipes 3 and 4 are joined by a T connection 5, one end 6 of said T connection supporting a valve seat 7, which is in direct alinement with the pipe 4 and the tank 2.

Connected to the cylinder 1 is a horizontally disposed exhaust pipe 8 and in connection with this pipe, we use a thermostatic mechanism, which forms a part of our invention, together with certain valves and mechanisms carried by the pipe 4.

We provide the ends of the pipe 8 with two-part clamps 9 and 10, the clamp 9 having rearwardly extending ends 11, between which is pivotally mounted a bell crank lever 12. Fixed at one end to the clamp 9 beneath the pipe 8 is a bar 14, which extends forwardly between the depending ends 15 of the clamp 10, and is connected, as at 16 to a lever 17, the latter pivotally mounted at its lower end between the depending ends 15 of the clamp 10. The opposite end of the lever 17 is pivotally connected to a rod 18 composed of a suitable expansive material. The rod 18 extends through the pipe 8 and the elbow 19 thereof and is connected to the bell crank lever 12, as at 20.

The exhaust of the gas engine when passing through the pipe 8, is adapted to expand said pipe and move the depending ends 15 of the clamp 10 forward, and since the bar 14 is immovably held from the rear end of the pipe 8, the lever 17 will be moved, which together with the expansion of the rod 18, will act upon the shorter end of the bell crank 12 and lower the longer arm 21 of the same. The contraction of the pipe 8 and rod 18 moves the bell crank lever 12 in a reverse direction.

The mechanism carried by the pipe 4 consists of a two part clamp 22 having two forwardly extending arms 23 and 24, the arm 24 being immovably held beneath the pipe 4, while the arm 23 is pivoted in the clamp 22, as at 25, and is provided with a hook shaped end 26. The arm 23 is adjustably connected to the bell crank lever 12 by a rod 27. Pivotally mounted in the free end of the arm 24 is a lever 28, to which is pivotally connected a rod 29, said rod extending through a spider 30 of the valve seat 7, and thence through the pipe 4, into a valve body 31 carried by said pipe, at its inner end the rod 29 is provided with a valve head 32 adapted to engage in the seat 33 of said valve body.

Upon the rod 29 contiguous to the lever 28 is mounted a cross head 34 carrying a leather or other flexible disk 35 adapted to engage the valve seat 7 and close the end 6 of the T connection 5. Slidably mounted upon the pipe 4 between the clamp 22 and the T connection 5 is a cross head 36, which is connected to the cross head 34 by rods 37. The cross head 34 is normally held with its disk 35 in an open position by a coiled spring 38 interposed between the cross head 36 and the clamp 22 and surrounding the pipe 4.

Operation:—When the gas engine is in operation, the end 6 of the T connection 5 is closed by the operator, by forcing the cross head 34, against the valve seat 7 where it is held by the arm 23 engaging the upper end of the lever 28. This position of the cross head 34 places the spring 38 under tension, and allows water to flow from the tank 2, through pipes 4 and 3, to the cylinder 1.

Should a cessation in the operation of the engine occur, the contraction of the pipe 8 causes the rod 18 to move forwardly, and through the medium of bell crank lever 12, elevate rod 27 and arm 23, releasing lever 28, and allowing spring 38 to move the cross head 34. As the lever 28 is moved outwardly under the action of the spring 38, rod 29 is actuated so as to close the valve 32 against valve seat 33, thus shutting off the flow of water through pipe 4, and preventing water from entering the water jacket of the cylinder, and allowing said jacket to thoroughly drain through the pipe 3, T 5, and valve seat 7.

We do not care to confine ourselves to the specific arrangement of the pipes 3 and 4, or even their appurtenant parts, as such changes in the details of construction as are permissible by the appended claims, may be resorted to without departing from the spirit and scope of the invention.

What we claim and desire to secure by Letters Patent, is:—

1. Means for controlling a water supply to the jacket of a gas engine comprising a T-coupling having a valve seat, a water conduit connected to one of the branches of said coupling and communicating with the water jacket, a water supply pipe opening at one end in another branch of said coupling, the remaining branch of said coupling adapted to open into the atmosphere, a valve for closing that branch which opens into the atmosphere, a valve adapted to engage said seat thereby closing said conduit to said supply pipe, connections between said valves, said valve adapted to engage said seat being normally open and the other valve being normally closed, mechanism for holding said valves in their normal position, means for releasing said mechanism, and means operated simultaneously with the releasing of said mechanism, whereby said valves are shifted from their normal position.

2. Means for controlling a water supply to the jacket of a gas engine comprising a T-coupling having a valve seat, a water conduit connected to one of the branches of said coupling and communicating with the water jacket, a water supply pipe opening at one end in another branch of said coupling, the remaining branch of said coupling adapted to open into the atmosphere, a valve for closing that branch which opens into the atmosphere, a valve adapted to engage said seat thereby closing said conduit to said supply pipe, connections between said valves, said valve adapted to engage said seat being normally open and the other valve being normally closed, mechanism for holding said valves in their normal position, thermostatic means for releasing said mechanism, and means operated simultaneously with the releasing of said mechanism whereby said valves are shifted from their normal position.

In testimony whereof we affix our signatures in the presence of two witnesses.

MARVIN V. ROBINSON.
JAMES S. SEYBERT.

Witnesses:
WILLIAM E. JAMES,
RICHARD J. GUISFORD.